United States Patent
Morohashi et al.

[11] Patent Number: 5,838,079
[45] Date of Patent: Nov. 17, 1998

[54] SYNCHRONOUS LINEAR MOTOR USING PERMANENT MAGNET

[75] Inventors: Nobutaka Morohashi; Susumu Kato, both of Tokyo, Japan

[73] Assignee: Mitsubishi Denki Kabushiki Kaisha, Tokyo, Japan

[21] Appl. No.: 756,248

[22] Filed: Nov. 25, 1996

[30]   Foreign Application Priority Data

May 28, 1996  [JP]  Japan .................................... 8-133911

[51] Int. Cl.⁶ ................................................. H02K 41/00
[52] U.S. Cl. ................................. 310/12; 310/14; 310/16; 310/58; 310/62
[58] Field of Search ................................ 310/12, 14, 16, 310/62, 58, 13, 52

[56]           References Cited

U.S. PATENT DOCUMENTS

| | | | |
|---|---|---|---|
| 4,626,720 | 12/1986 | Fukusaku et al. | 310/62 |
| 4,916,340 | 4/1990 | Negishi | 310/12 |
| 5,066,897 | 11/1991 | Ueda et al. | 318/135 |
| 5,099,160 | 3/1992 | Strozel et al. | 310/56 |
| 5,179,305 | 1/1993 | Van Engelen | 310/13 |
| 5,196,745 | 3/1993 | Trumper | 310/12 |
| 5,302,872 | 4/1994 | Ohki et al. | 310/12 |
| 5,349,256 | 9/1994 | Holliday | 310/12 |
| 5,373,120 | 12/1994 | Barrett et al. | 187/316 |
| 5,550,418 | 8/1996 | Chung | 310/239 |

FOREIGN PATENT DOCUMENTS

| | | | |
|---|---|---|---|
| 63-187631 | 8/1988 | DPR of Korea | 310/12 |
| 2-108995 | 4/1990 | Japan | 310/12 |
| 2-246705 | 10/1990 | Japan | 310/12 |

*Primary Examiner*—Steven L. Stephan
*Assistant Examiner*—Elvin G. Enad
*Attorney, Agent, or Firm*—Sughrue, Mion, Zinn, Macpeak & Seas, PLLC

[57]           ABSTRACT

A synchronous type of linear motor using a permanent magnet comprising a primary magnetic pole member (a three-phase coil) and a secondary magnetic pole member (a permanent magnet) each for generating a repulsive force making use of mutual repulsion between a movable element and a fixed board.

7 Claims, 18 Drawing Sheets

FIG.5A
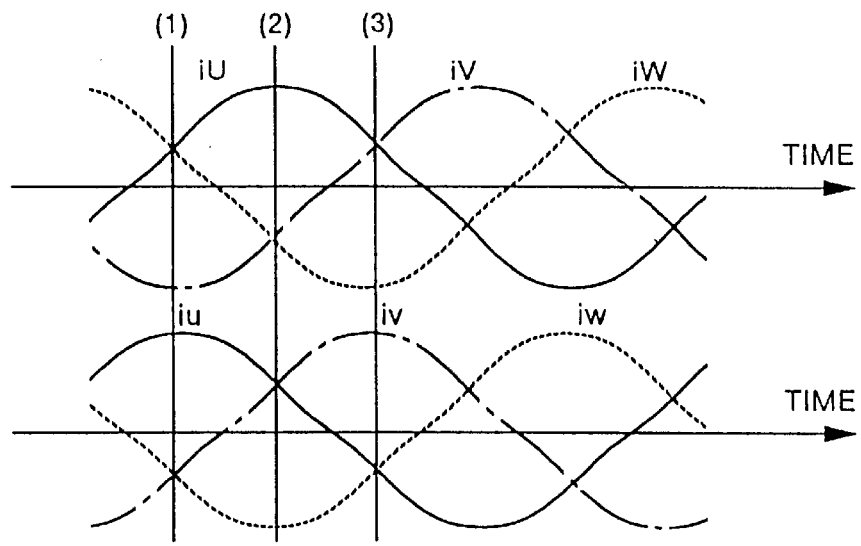
FIG.5B(1)
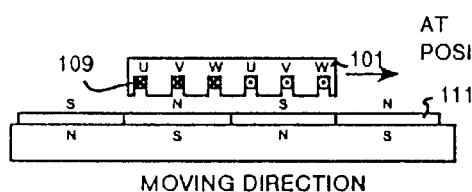
MOVING DIRECTION
FIG.5B(2)
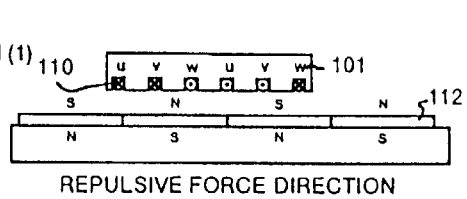
REPULSIVE FORCE DIRECTION
FIG.5B(3)
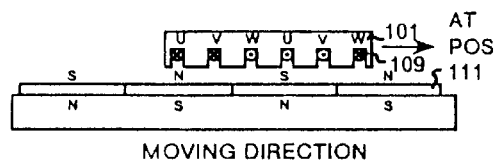
MOVING DIRECTION
FIG.5B(4)
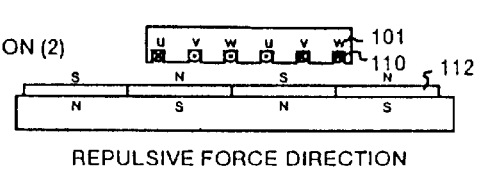
REPULSIVE FORCE DIRECTION
FIG.5B(5)
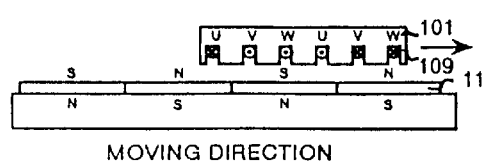
MOVING DIRECTION
FIG.5B(6)
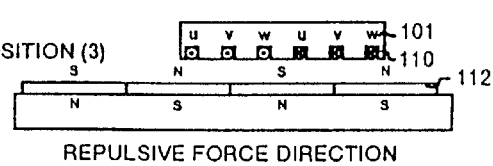
REPULSIVE FORCE DIRECTION

SYNCHRONOUS LINEAR MOTOR USING PERMANENT MAGNET

FIELD OF THE INVENTION

The present invention relates to a synchronous linear motor using a permanent magnet, and more particularly to a synchronous linear motor using a permanent magnet used for factory automation equipment requiring a high positional precision such as a precision mobile table and a stage or the like.

BACKGROUND OF THE INVENTION

FIG. 11, FIG. 12, and FIG. 13 each show an example of configuration of a synchronous linear motor using a permanent magnet based on the conventional technology respectively. This linear motor comprises a linear motor movable element 101 and a fixed board 103, and the movable element 101 moves along a straight line on the fixed board 103 being guided by a linear movement guide section 102 provided in the fixed board 103 as well as in a primary frame (movable frame) 104 in a longitudinal direction in FIG. 12. A primary magnetic pole member 105 is attached to the bottom surface of the movable element 101, and a secondary magnetic pole member 106 is attached to the top surface of the fixed board 103, and the primary magnetic pole member 105 and the secondary magnetic pole member 106 are opposed to each other with a specified gap therebetween in the vertical direction.

The primary magnetic pole member 105 comprises a iron core 105a having a plurality of grooves 105b formed with a specified space from each other in the direction of movement, and three-phase coils 109 UVW embedded in each of the grooves 105b of the iron core 105a.

The secondary magnetic pole member 106 comprises a base plate member 106a, and a plurality of permanent magnets (fixed side magnet) 111 provided with a specified space in the direction of movement so that magnetic poles adjoining on the top surface of the base plate member 106a are contrary to each other, namely the north pole and the south pole thereof are alternately arranged thereon.

Also as another example based on the conventional technology, there is the one as disclosed in Japanese Patent Application Laid-Open No. HEI 2-108995. In the linear motor disclosed in this publication, as shown in FIG. 14 and FIG. 15, magnets 140 for generation of a repulsive force are arranged on the movable element 101 and also on the fixed board 103 in a form of a pair in addition to the primary magnetic pole member 105 and the secondary magnetic pole member 106 each for generation of thrust. The reference numeral 102 indicates a linear movement guide section.

Description is made for an operating principle of the synchronous linear motor using a permanent magnet based on the conventional technology with reference to FIG. 16 and FIGS. 17A and 17B. FIG. 16 shows a servo control system of a linear motor. This servo control system constitutes a feedback control system in which a positional control loop is formed as a main loop and a speed control loop and a current control loop are formed as a minor loop, and comprises a position command device 201, a position controller 202, a speed controller 203, a current controller 204, a three-phase converter 205, an electric power amplifier 206 with PWM, a current sensor 207, a linear scale 208, a differentiator 209, an amplitude converter 210, and a magnetic pole detector 211, and a position of the movable element 101 is detected by the linear scale 208 according to a position command target value outputted by the position command device 201, and a feedback control is provided so that a deviation between the position command target value and the position detection value will be zero.

FIG. 17A shows a waveform of a current fed to three-phase coils UVW as a manipulated variable to the linear motor with the servo control system described above. Currents iu, iv, iw in each phase have sinusoidal wave-forms each having a time lag of 120 degrees from each other according to a position of the opposite magnetic pole.

FIG. 17B shows a relative relation between a current flowing in the three-phase coils UVW in particular time zones (1), (2), (3) shown in FIG. 17A and the primary and secondary magnetic pole members 105 and 106 in each of the times. In FIG. 17B, and in the time zero (1), currents $U_1$, $V_1$, $W_1$ on the north pole flow from the surface side to the rear side on the drawing (in the regular direction) and currents $U_2$, $V_2$, $W_2$ thereon flow from the rear side to the surface side on the drawing (in the opposite direction). Accordingly the movable element 101 moves in the direction indicated with the arrow according to the Fleming's left-hand rule.

Next, in the time zone (2), currents $U_1$, $V_1$, $W_2$ flow in the regular direction and currents $U_2$, $V_2$, $W_1$, flow in the opposite direction. Accordingly the movable element 101 also moves in the direction indicated with the arrow.

Then, in the time zone (3), currents $U_1$, $V_2$, $W_2$ flow in the regular direction and currents $U_2$, $V_1$, $W_1$, flow in the opposite direction. Accordingly the movable element 101 also moves in the direction indicated with the arrow.

Herein, the movable element 101 can move in a specified direction at a given speed by changing a cycle of a sinusoidal wave fed to the three-phase coils uvw.

In the linear motor disclosed in Japanese Patent Application Laid-Open No. HEI 2-108995, an attracting force generated simultaneously when thrust of the primary magnetic pole member 105 driving the movable element 101 and the secondary magnetic pole member 106 is generated is canceled out with the repulsive force generated by a repulsive force generating magnet 140, and in appearance, an attracting force is not effected between the movable element 101 and fixed board 103, so that static friction which the linear movement guide section 102 is very small.

The primary magnetic pole member 105 in the synchronous linear motor using a permanent magnet based on the conventional technology has an iron core. A fare weight of the movable element 101 including a weight of the primary magnetic pole member 105 and loaded weight on the movable element 101 are a load to the linear movement guide section 102, and another load is applied thereto because of an attracting force of the permanent magnet 111 provided in the secondary magnet pole member 106. This load is translated into static friction in the linear movement guide section 102 of the movable element 101, and the movement of the movable element 101 is hindered due to the fact that the static friction overcomes a minute thrust corresponding to a minute position command target value. Also, an excessive response in association with elimination of the static friction of the movable element 101 is generated due to a large thrust command value for eliminating a subordinate deviation sensed by a linear servo system, so that precise positioning can not be performed.

When the movable element 101 is moved without feeding a current to the primary magnetic pole member 105 in the linear motor, there is generated thrust ripple which is thrust generated according to a mutual effect between the primary magnetic pole member 105 and the secondary magnetic pole member 106 and is generally called cogging torque (cogging thrust). This thrust ripple also appears as thrust ripple even when the linear motor is driven, so that it is understood from the case described above that a precise positioning can not be performed with the conventional type of synchronous linear motor using a permanent magnet.

The permanent magnet 111 provided in the secondary magnetic pole member 106 attracts iron powder sucked from the peripheral environment, so that an air gap between the primary magnetic pole member 105 and the secondary magnetic pole member 106 becomes narrower over time in the conventional type of synchronous linear motor using a permanent magnet. Consequently, the cogging torque described above becomes large, and for this reason, when the motor is used for a long period of time, a precise positioning becomes more and more difficult to be performed.

FIG. 18 shows a change of cogging torque when an air gap between the primary magnetic pole member 105 and the secondary magnetic pole member 106 is changed. It is understood that, when the air gap becomes smaller, the cogging torque becomes larger. This case described above is equivalent to a phenomenon in which, when iron powder is attracted to the surface of the magnet because of a strong suction force of the permanent magnet 111, cogging torque becomes large.

Accordingly, the iron powder attracted to the surface of the permanent magnet 111 is required to be periodically removed from the permanent magnet 111, but the attracting force of the permanent magnet 111 is strong, so that there are many cases that it is hard to physically remove the iron powder therefrom.

In the linear motor disclosed in Japanese Patent Application Laid-Open No. HEI 2-108995, to cancel out an attracting force generated between magnetic poles generating thrust, it is required to discretely provide a repulsive force generating magnet, and also to select a magnet and to adjust the magnet for making the attracting force generated between the magnetic poles generating thrust equal to the repulsive force between repulsive force generating magnets. However, there are some problems concerning the countermeasures against a change of a static friction in the linear movement guide section according to load fluctuation in the movable element.

SUMMARY OF THE INVENTION

It is an object of the present invention to obtain a synchronous linear motor using a permanent magnet in which a positioning precision can be improved by reducing static friction and cogging torque in the linear movement guide section of the movable element, and also in which a positioning precision can be maintained with stability over time by preventing time course degeneration of positioning precision due to increase of cogging torque with the passage of time caused by attracted iron powder.

In the synchronous linear motor using a permanent magnet according to the present invention, an armature coil and a fixed side magnet both for generation of a repulsive force generates a repulsive force, by making use of a mutual repulsion therebetween for canceling out the load generated with a fare weight of a movable element and a loaded weight thereon, and reduces the load to the linear movement guide section.

In the synchronous linear motor using a permanent magnet according to the present invention, electric connection to the armature coil for generation of a repulsive force is controlled so that the load detected by a load detecting sensor will be zero, and the armature coil and the fixed side magnet both for generation of a repulsive force generate a repulsive force so that the force can completely cancel out a fare weight of the movable element and a loaded weight thereon, so that the load of the linear movement guide section according to the fare weight of the movable element and the loaded weight thereon will be zero.

In the synchronous linear motor using a permanent magnet according to the present invention, iron powder attracted to the fixed side magnet is heated up with a heater, whereby the iron powder can be made non-magnetic, which makes it possible to easily remove the iron powder from the fixed side magnet.

In the synchronous linear motor using a permanent magnet according to the present invention, the iron powder made non-magnetic by being heated up with the heater is removed by blowing off from the fixed side magnet.

In the synchronous linear motor using a permanent magnet according to the present invention, in a case where a cross beam or the like is driven by driving two units of synchronous linear motor each using a permanent magnet in synchronism with each other, a pitch of each fixed side magnet in the two units of motor can relatively be displaced from each other with an adjusting mechanism.

Other objects and features of this invention will become understood from the following description with reference to the accompanying drawings.

BRIEF DESCRIPTION OF THE DRAWINGS

FIG. 5A and FIGS. 5B(1) to 5B(6) are explanatory views each showing an operating principle of the synchronous linear motor using a permanent magnet according to the present invention;

DESCRIPTION OF THE PREFERRED EMBODIMENTS

Figure 1:
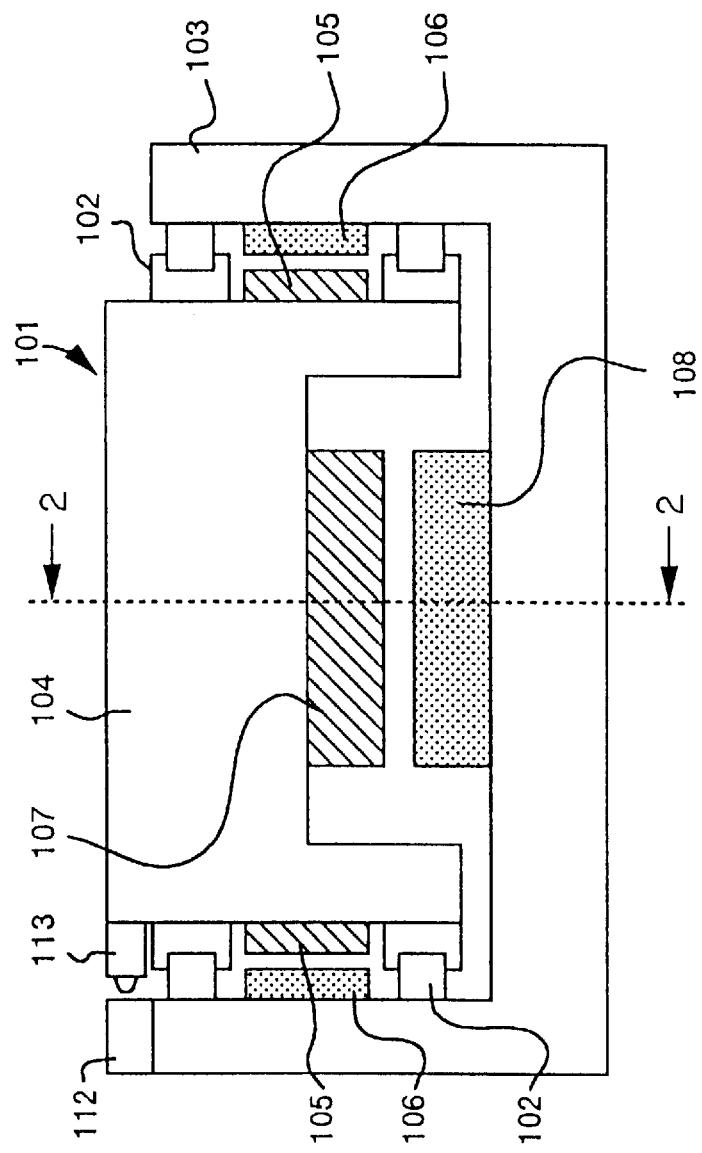
FIG. 1 is an explanatory view showing Embodiment 1 of the synchronous linear motor using a permanent magnet according to the present invention viewed from the moving direction of the movable element.

Detailed description is made hereinafter for embodiments of the present invention with reference to the related drawings. It should be noted that, in the embodiments of the present invention described below, the same reference numerals are assigned to the portions of the configuration corresponding to those in the example based on the conventional technology, and description thereof is omitted herein.

Figure 2:
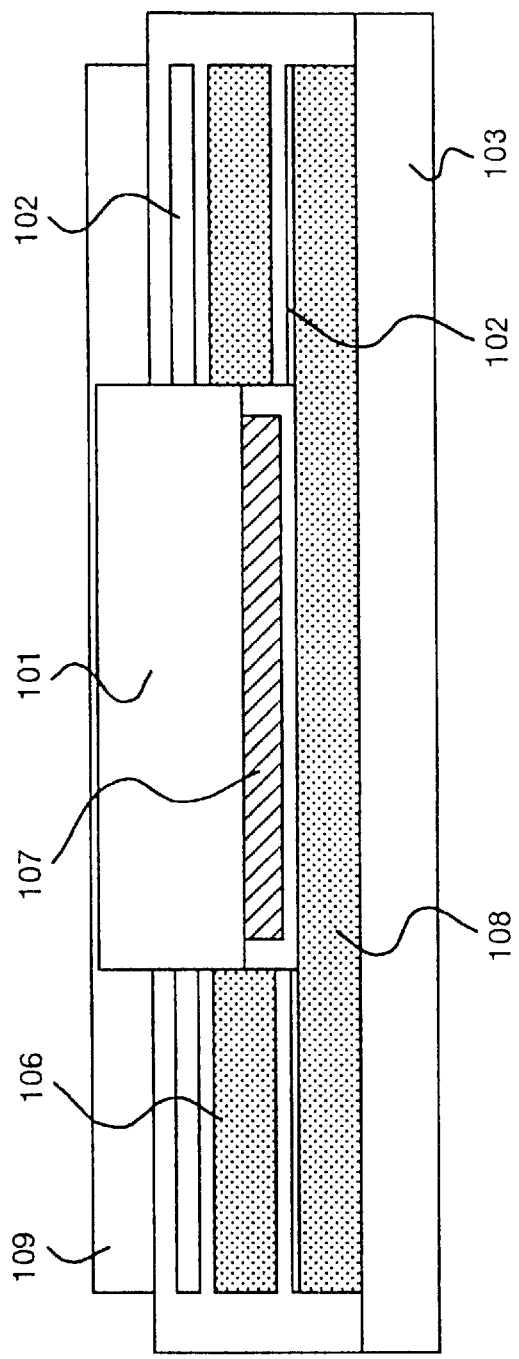
FIG. 2 is a cross-sectional view taken along the line 9—9 shown in FIG. 1.
Figure 13:
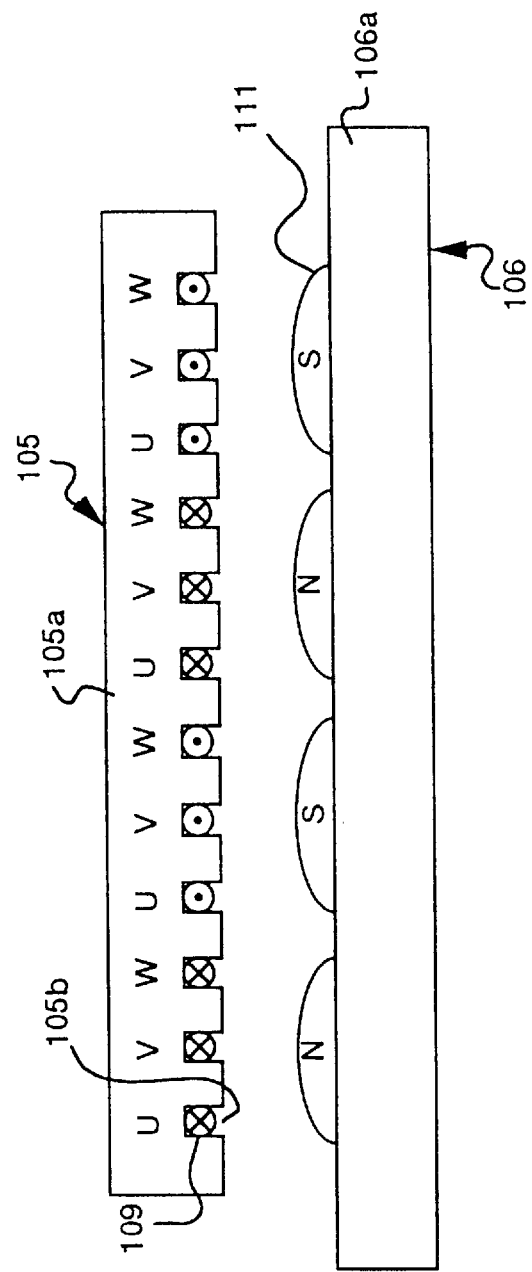
FIG. 13 is a cross-sectional view taken along the line 13—13 shown in FIG. 11.
Figure 14:
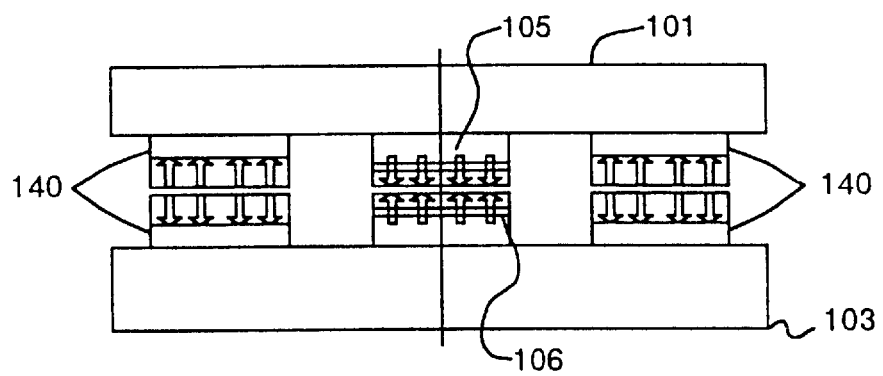
FIG. 14 is a front view showing the synchronous linear motor using a permanent magnet based on the conventional technology.
Figure 15:
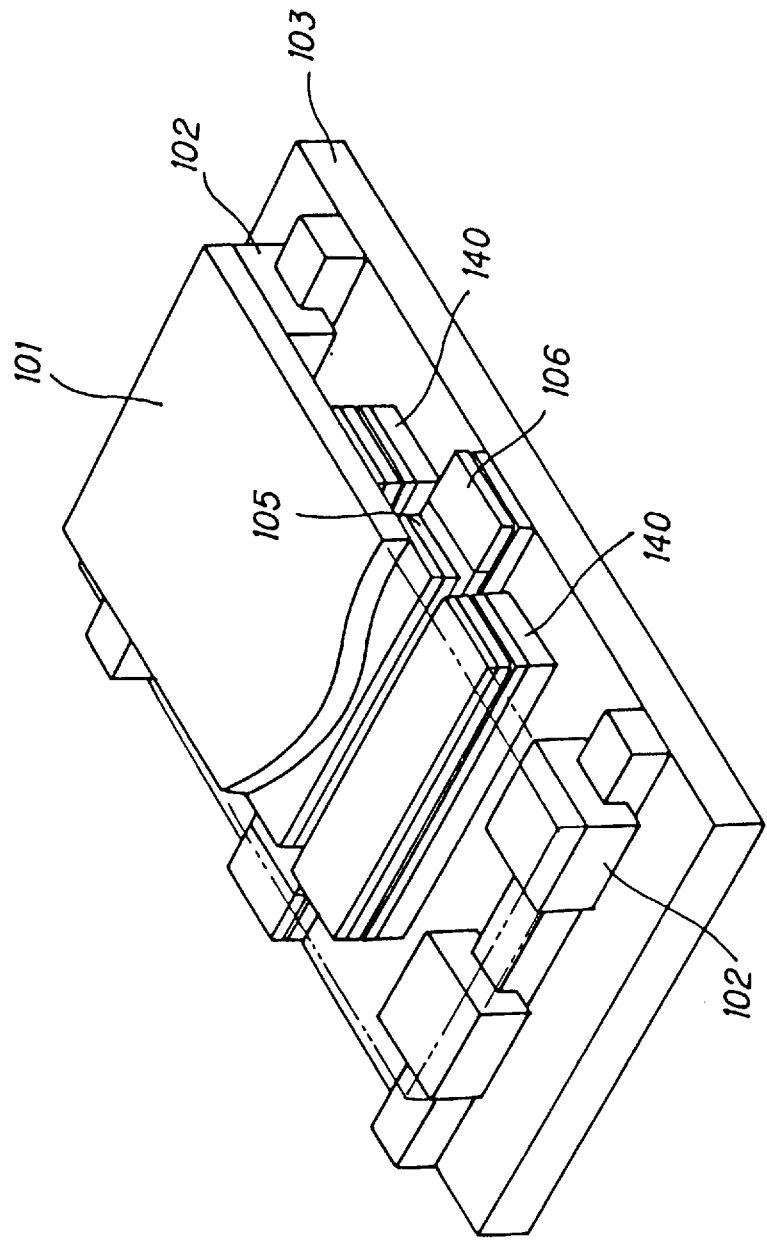
FIG. 15 is a perspective view showing the synchronous linear motor using a permanent magnet based on the conventional technology.
Figure 16:
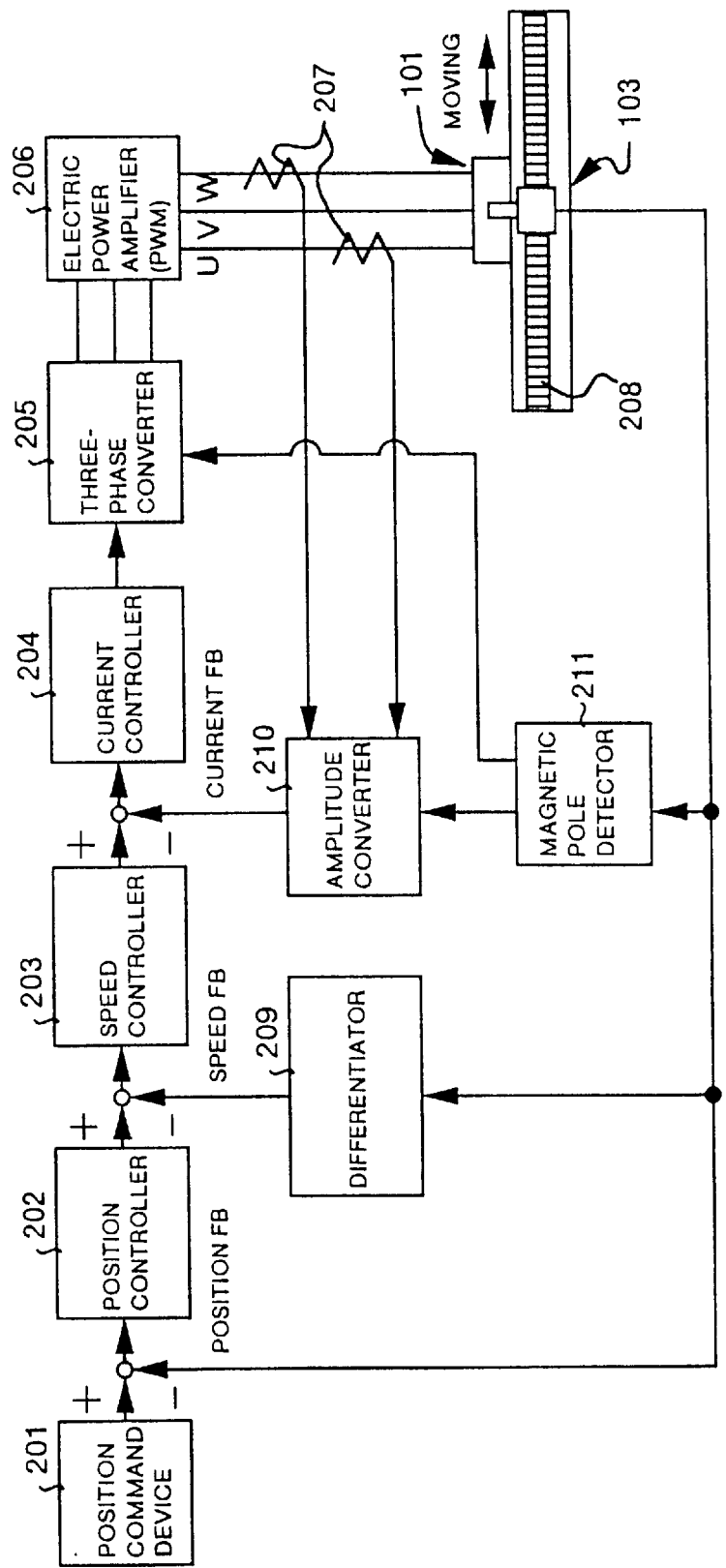
FIG. 16 is a block diagram showing configuration of a servo control system for the synchronous linear motor using a permanent magnet based on the conventional technology.
Figure 17A:
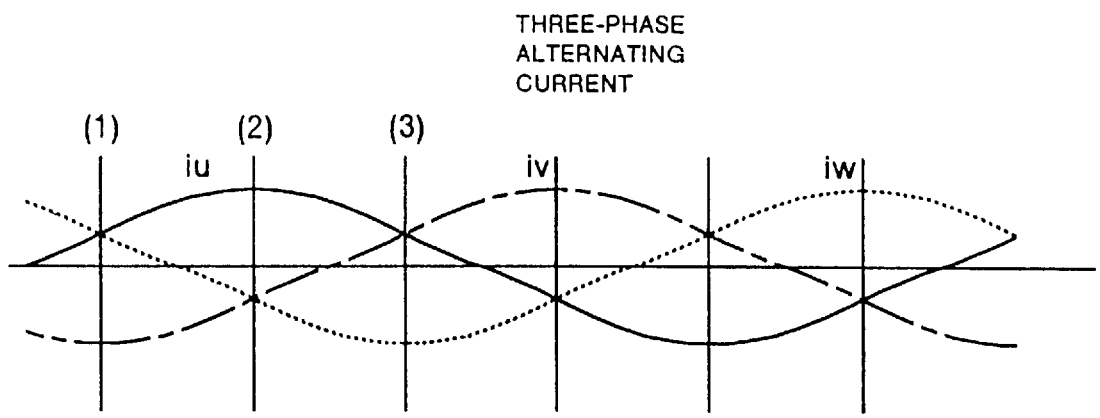
FIG. 17A and FIG. 17B are explanatory views each showing an operating principle of the synchronous linear motor using a permanent magnet based on the conventional technology.
Figure 17B:
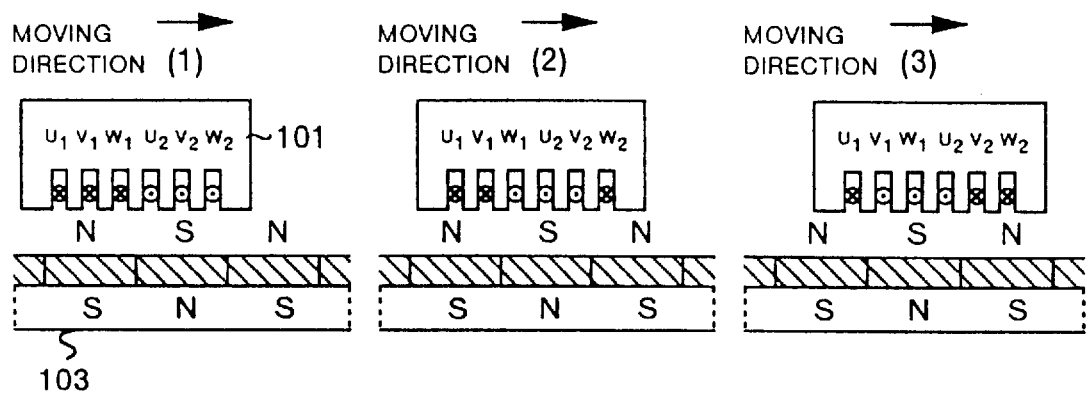
Figure 18:
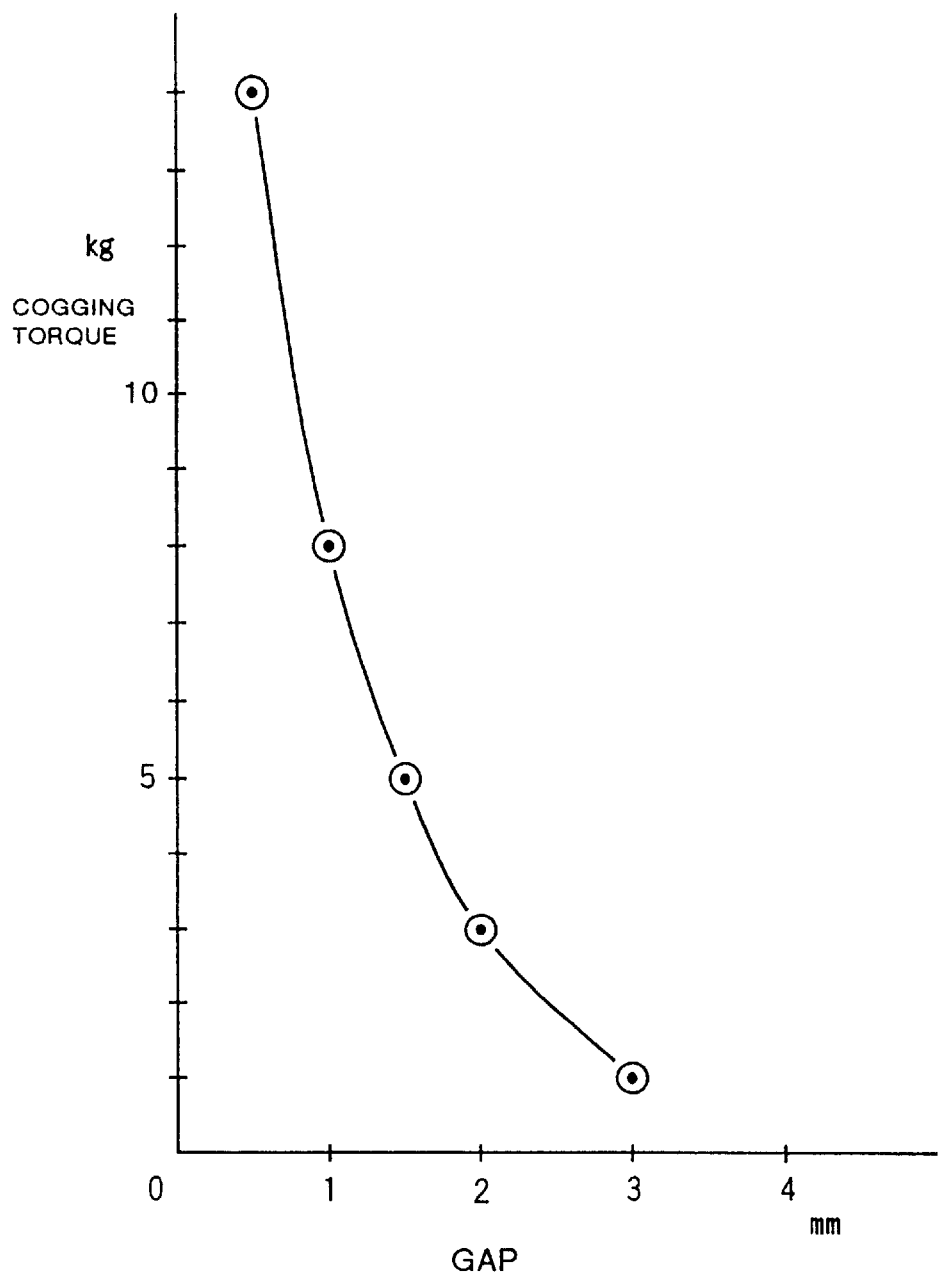
FIG. 18 is a graph showing a relation between a gap and the cogging torque.

FIG. 1 and FIG. 2 show Embodiment 1 of the synchronous linear motor using a permanent magnet according to the present invention. In the synchronous linear motor using a permanent magnet, a fixed board 103 is formed in a groove shape having a transverse cross section of a ⊃-shape, and a secondary magnet pole member 106 for thrust and a primary magnet pole member 105 for thrust each for generating thrust respectively are provided in both of side wall sections of the fixed board 103 as well as in both of vertical side wall sections of a primary frame 104 in a movable element 101 respectively at positions opposing to each other with a specified gap therebetween. The secondary magnet pole member 106 for thrust and the primary magnet pole member 105 for thrust each have the same configuration as that based on the conventional technology shown in FIG. 13.

Three-phase coils 109 of the primary magnet pole member 105 for thrust and a fixed side magnet 111 (Refer to FIG. 13) of the secondary magnet pole member 106 for thrust situated on the both sides of the movable element 101 are provided so as to mutually cancel out attracting force effecting therebetween.

The two pairs of the three-phase coils 109 and the fixed side magnet 111 mutually cancel out the attracting force effecting therebetween, so that increase of a load in a linear movement guide section 102 due to the attracting force can be avoided.

A primary magnet pole member 107 for a repulsive force and a secondary magnet pole member 108 for a repulsive force both for generating a repulsive force in the direction in which load of the movable element is received by making use of a mutual repulsion are provided with a specified space therebetween at positions opposing to each other on the bottom surface of the primary frame 104 and on the top surface of the fixed board 103.

Figure 3:
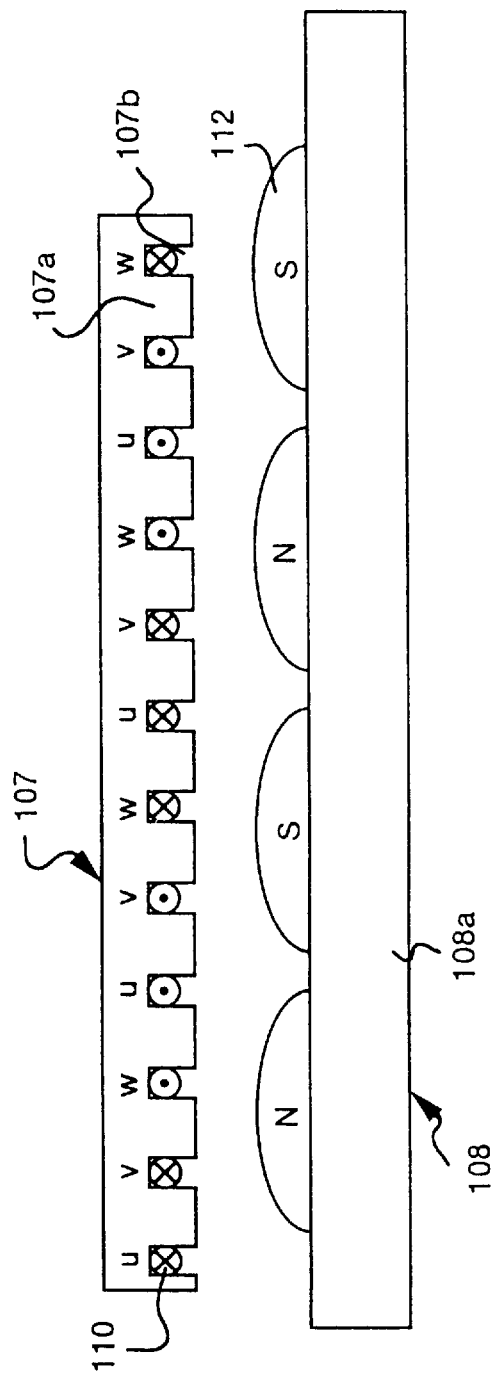
FIG. 3 is an explanatory view showing detailed configuration of the armature coil and fixed side magnet both for generation of a repulsive force.

The primary magnet pole member 107 for a repulsive force, as shown in FIG. 3, comprises an iron core 107a having a plurality of groove sections 107b formed with a specified space from each other in the moving direction, and three-phase coils 110 uvw each embedded in each of the grooves 107b of the iron core 107a.

The secondary magnet pole member 108 for a repulsive force, as shown in FIG. 3, comprises a base plate member 108a and permanent magnets 112 each provided with a specified space from each other on the top surface of the base plate member 108a so that the north pole and the south pole thereof are alternately provided thereon in the direction of the movement.

As shown in FIG. 1, a scale 112 is attached to the fixed board 103, and a position detecting sensor 113 is attached to the primary frame 104 respectively, and the position detecting sensor 113 together with the scale 112 detects an absolute position of the movable element 101. The scale 112 and position detecting sensor 113 constitute a linear scale (208).

Figure 4:
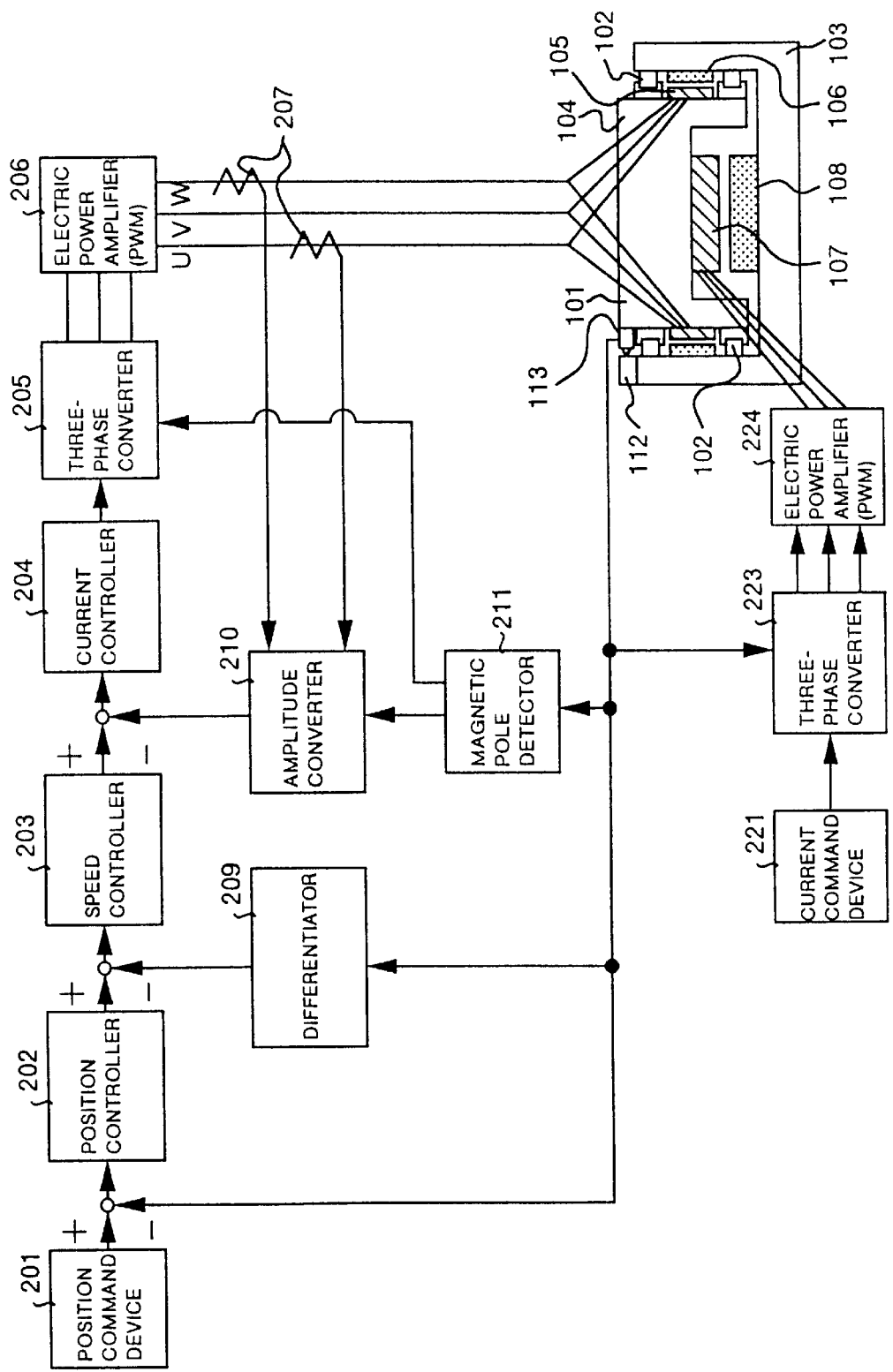
FIG. 4 is a block diagram showing configuration of a servo control system for the synchronous linear motor using a permanent magnet according to the present invention.

FIG. 4 shows a servo control system of the synchronous linear motor using a permanent magnet having the configuration described above. This servo control system comprises a current command device 221, a three-phase converter 223, and a current amplifier 224 with PWM as a control system for controlling electric connection to the three-phase coils 110 in the primary magnet pole member 107 for thrust, in addition to a feedback control system for thrust equivalent to that based on the conventional technology in which a position control loop is formed as a main loop, and a speed control loop and a current control loop are formed as a minor loop, in other words, in addition to a control system for controlling electric connection to the three-phase coils 109 in the primary magnet pole member 105 for a thrust.

The three-phase converter 223 receives a current command from the current command device 221 and absolute position data for the movable element 101 from the position detecting sensor 113, executes three-phase conversion according to the current command in a phase corresponding to the absolute position of the movable element 101, and outputs a PWM command in each phase UVW to the current amplifier 224.

A position is controlled with the servo control system by controlling electric signal to the three-phase coils 109 in the primary magnetic pole member 105 for thrust in the feedback control system so that a deviation between a position command target value and a position detection value will be zero, simultaneously, a current fed to the three-phase coils 110 uvw is also controlled so that the primary magnetic pole member 107 for a repulsive force generates a specified repulsive force to the secondary magnetic pole member 108 for a repulsive force.

FIG. 5A shows changes over time when a current is fed from the servo control system to the three-phase coils 109 UVW as well as to the three-phase coils 110 uvw as shown in FIG. 4.

As understood from FIG. 5A, currents iU, iV, iW fed to the three-phase coils 109 UVW and currents iu, iv, iw fed to the three-phase coils 110 uvw have sinusoidal wave-forms each having a time lag mutually by 120 degree from each other, and also a current iU, iV, iW fed to the three-phase coils 109 UVW has a phase difference by 60 degrees in the same phase from a current iu, iv, iw fed to the three-phase coils 110 uvw.

FIGS. 5B(1) to 5B(6) illustrate movement of the movable element 101 when the current flows to the three-phase coils 109 UVW and to the three-phase coils 110 uvw. At the time zone (1) shown in FIG. 5A, a V-phase coil of the three-phase coils 109 for generation of thrust is present in the respective middle position of the N polarity and the S polarity of the permanent magnet 111 and a maximum current flows therethrough (see FIG. 5B(1)), and the movable element 101 moves in the direction indicated by the arrow (in the right direction) according to the Fleming's right hand rule.

In this step, the maximum quantity of current flows to the u-phase coil in the three-phase coils 110 for generation of a repulsive force (see FIG. 5B(2)), and the north pole and the south pole of the electric magnet due to the three-phase coils 110 are formed on the north pole and the south pole of the permanent magnet 112, so that a repulsive force making use of a magnetic mutual repulsion therebetween is generated.

When the movable element 101 moves up to the position (2), the maximum quantity of current flows to the U-phase coil of the three-phase coils 109 for generation of thrust (see FIG. 5B(3)) and to the w-phase coil of the three-phase coils 110 for generation of a repulsive force (see FIG. 5B(4)), and the movable element 101 moves over to the position (3) in a state in which the repulsive force is generated in the same mechanism as that described above.

In the position (3), the maximum quantity of current flows to the w-phase coil of the three-phase coils 109 for generation of thrust (see FIG. 5B(5)) and to the v-phase coil of the three-phase coils 110 for generation of a repulsive force (see FIG. 5B(6)), and in this case also the repulsive force is generated in the same mechanism as that described above, then the movable element 101 moves in the same direction.

Accordingly, also in this case, the movable element 101 moves over in the fixed direction at a given speed by changing a cycle of the sinusoidal wave.

In this step, the repulsive force described above and load of the movable element 101 are balanced, so that any external force is not loaded to the linear movement guide section 102. With this feature, a static frictional force of the movable element 101 in the linear movement guide section 102 is substantially reduced, which makes it possible to perform precise positioning in a state of a low inertial force.

Figure 6:
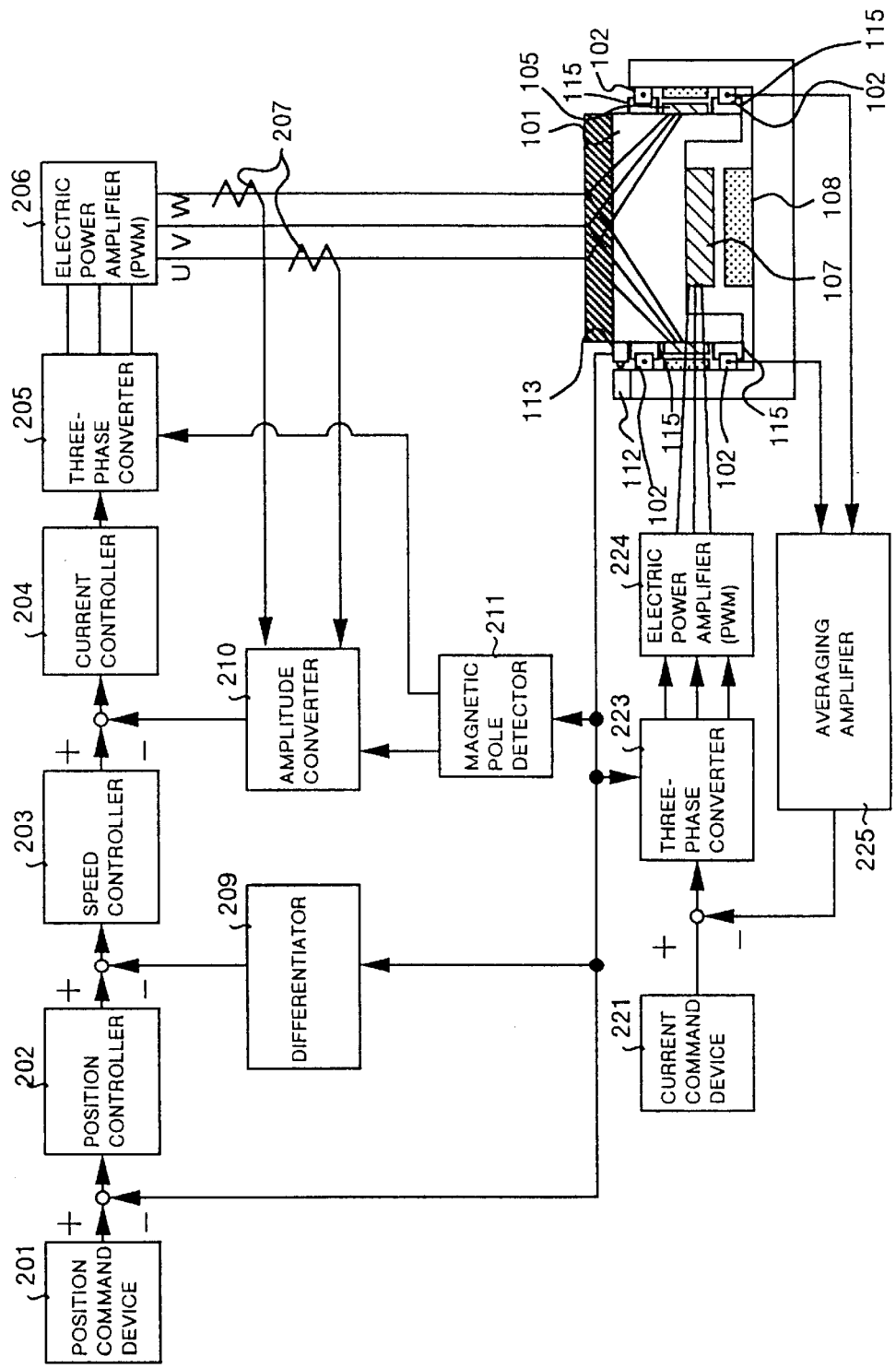
FIG. 6 is an explanatory view showing Embodiment 2 of the synchronous linear motor using a permanent magnet according to the present invention and a servo control system therefor.

FIG. 6 shows Embodiment 2 of the synchronous linear motor using a permanent magnet according to the present invention as well as the servo control system of the linear motor. It should be noted that, in FIG. 6, the portions corresponding to those in the FIG. 4 are designated at the same reference numerals as those in FIG. 4.

In the linear motor according to Embodiment 2, load detecting sensors 115 such as a distortion gage or the like are attached to both sides of the linear movement guide sections 102 respectively. The load detecting sensor 115 detects a load R of the movable element 101 (load due to the fare weight of the movable element 101 and a loaded weight thereto).

The servo control system comprises an averaging amplifier 225 for computing an average value among detection values of the load R by the load detecting sensors 115, and the averaging amplifier 225 outputs an average value signal of the load R as a feedback signal.

With this feature, in the control system for a repulsive force in the servo control system, feedback control is provided so that the load detected by the load detecting sensor 115 will be zero.

In this embodiment, even if the load R of the movable element 101 varies according to a loaded weight or the like, a current fed to the three-phase coils 110 uvw in the primary magnetic pole member 107 for a repulsive force in which a repulsive force is generated to the secondary magnetic pole member 108 for a repulsive force is controlled so that the load detecting sensor 115 detects and controls the load at the time and the load detected value will be zero, and for this reason, even when the load is changed, any external force is not loaded to the linear movement guide section 102. With this feature, a static frictional force in the linear movement guide section 102 of the movable element 101 can substantially be reduced, which makes it possible to perform a precise positioning in a state of a low inertial force.

Figure 7:
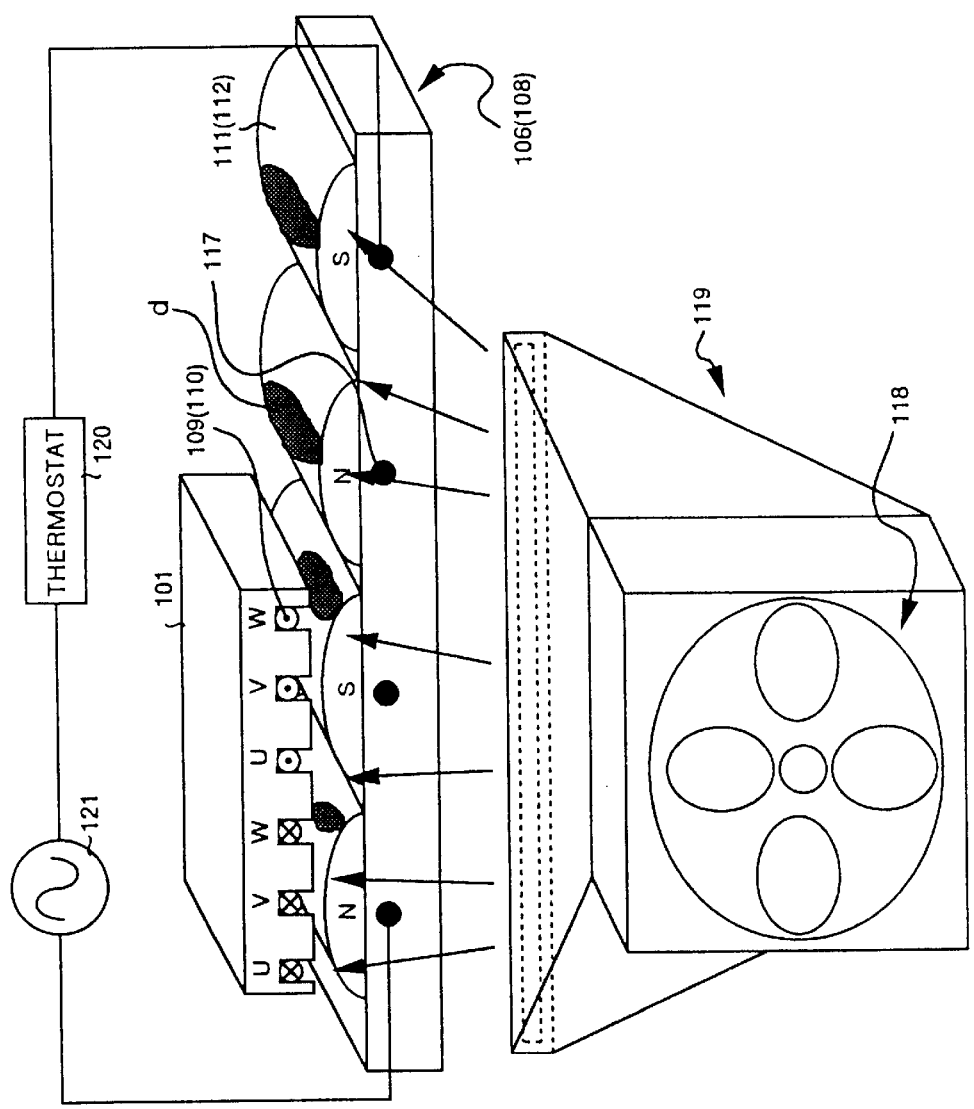
FIG. 7 is perspective view showing Embodiment 3 of the synchronous linear motor using a permanent magnet according to the present invention.

FIG. 7 shows Embodiment 3 of the synchronous linear motor using a permanent magnet according to the present invention. It should be noted that, in FIG. 7, the portions corresponding to those in the FIG. 4 are indicated by the same reference numerals as those in FIG. 4.

The synchronous linear motor using a permanent magnet according to this embodiment comprises heaters 117 each provided in the secondary magnetic pole member 106 for thrust and that 108 for a repulsive force respectively, a blower 118 for blowing off iron powder, and an air duct nozzle 119 for guiding air for the blower 118 and projecting the air at high speed to the secondary magnetic pole member 106 for thrust and that 108 for a repulsive force respectively as well as to permanent magnets 111 and 112.

The heater 117 is connected to a power circuit 121, electric connection of which is controlled by a thermostat 120 for sensing a temperature of the secondary magnetic pole member 106 for thrust and that 108 for a repulsive force, and heats up the iron powder d attracted to the surface of the permanent magnets 111 and 112 to a temperature higher than the Curie point.

In this embodiment, when the magnet is regenerated (when attracted iron powder is removed), the secondary magnetic pole member 106 for thrust and that 108 for a repulsive force are heated up by the heater 117, and the temperature of the permanent magnets 111 and 112 increases in association with the heating operation.

With this feature, the iron powder d attracted to the surface of the permanent magnets 111 and 112 is heated up, and when the temperature exceeds the Curie point, the magnetism thereof is eliminated. The Curie point of iron oxide varies according to metals contained therein, but generally is in a range from around 100° C. to 600° C., so that the Curie point thereof is lower than that of sintered magnetism of rare earth metals which are materials constituting the permanent magnets 111 and 112. For instance, the Curie point of Sm-Co base sintered magnet is in a range from around 700° C. to 850° C. By making use of a temperature difference between the Curie points, only magnetism of the iron powder d attracted to the permanent magnets 111 and 112 can be eliminated.

The air generated by the blower 118 is projected at a high speed from the air duct nozzle 119 to the permanent magnets 111 and 112, so that the iron powder d of which magnetism is eliminated caused by the heating-up is blown off.

With this feature, each of the air gaps between the primary magnetic pole members 105, 107 and the secondary magnetic pole members 106, 108 each for thrust and for a repulsive force respectively returns to the initial state, and the system control returns to the initialized cogging torque. As a result, time course fluctuations of the thrust and repulsive force thereof can be reduced, so that high precision positioning can be performed over the long period of time.

Figure 8:
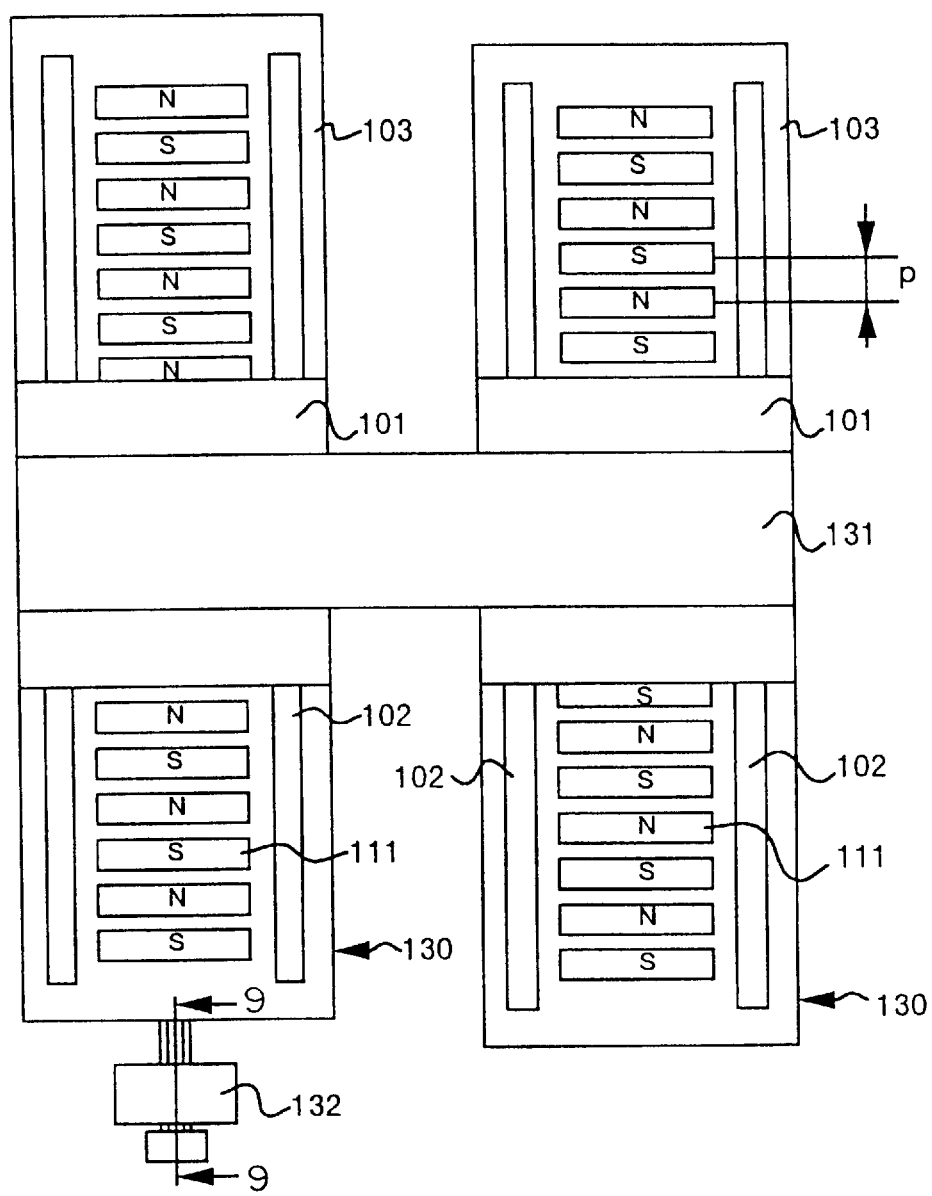
FIG. 8 is a plan view showing Embodiment 4 of the synchronous linear motor using a permanent magnet according to the present invention.
Figure 9:
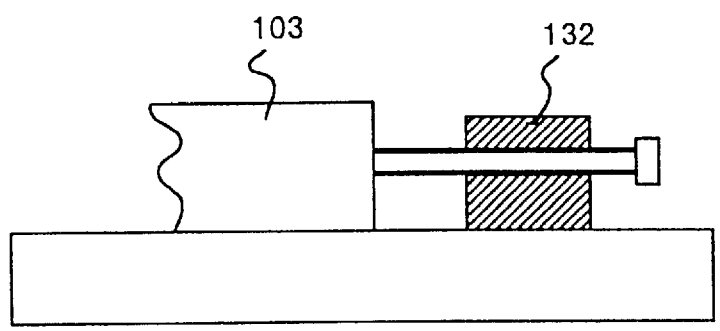
FIG. 9 is an enlarged cross-sectional view taken along the line 9—9 shown in FIG. 8.

FIG. 8 shows Embodiment 4 of the synchronous linear motor using a permanent magnet according to the present invention, and FIG. 9 is a cross-sectional view taken along the line 9—9 shown in FIG. 8.

In this embodiment, two units of synchronous linear motor each using a permanent magnet 130 are provided in parallel, and the two units of the linear motor 130 are coupled to each other with a cross beam 131, so that the cross beam 131 is moved in parallel by driving the two units thereof in synchronism with each other.

The fixed board 103 in the one side of the linear motor 130 is position-adjustable with an adjuster screw of a fixed position adjuster 132 in the direction of movement of the movable element 101.

Figure 10:
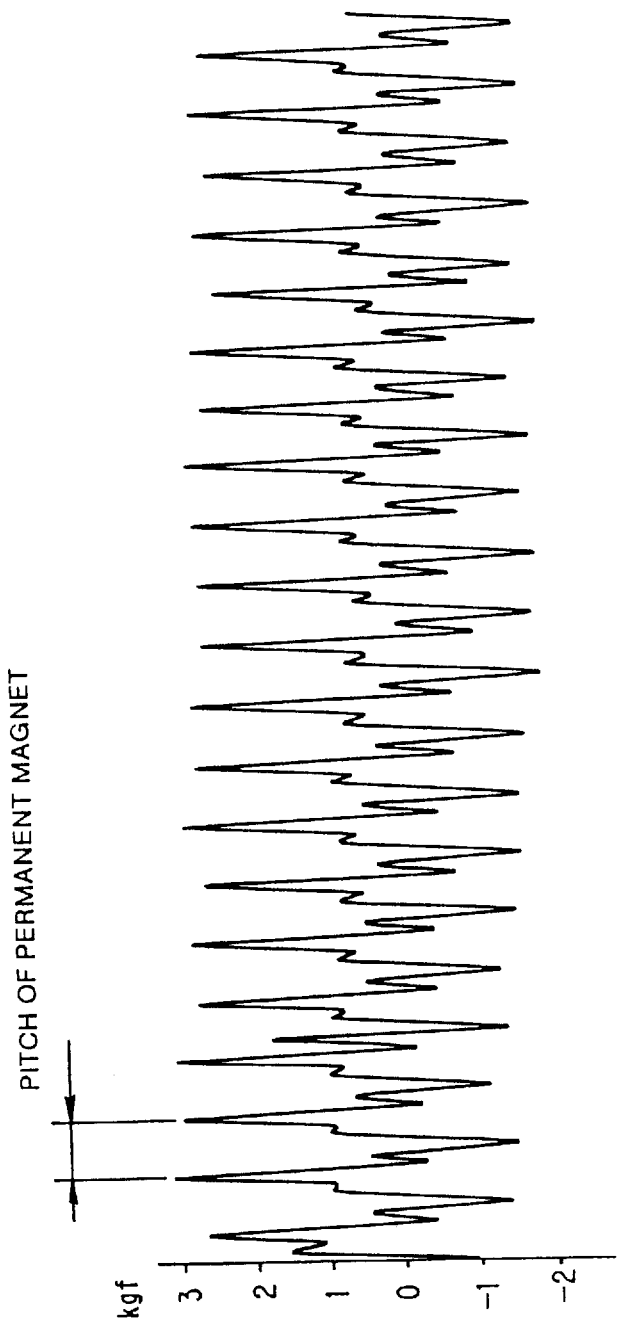
FIG. 10 is a graph showing a measurement result of cogging torque for the motor itself.
Figure 11:
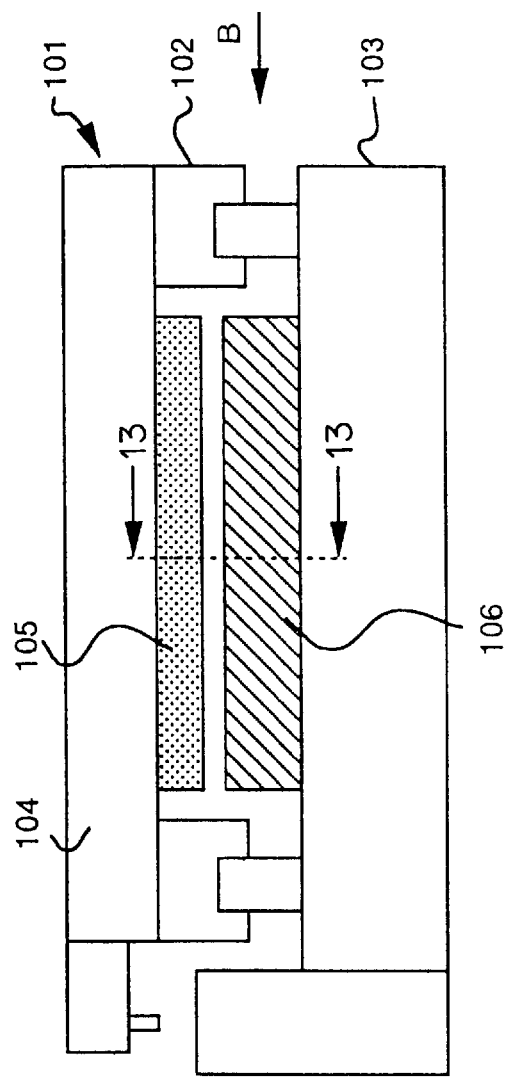
FIG. 11 is an explanatory view showing the synchronous linear motor using a permanent magnet based on the conventional technology viewed from the moving direction of the movable element.
Figure 12:
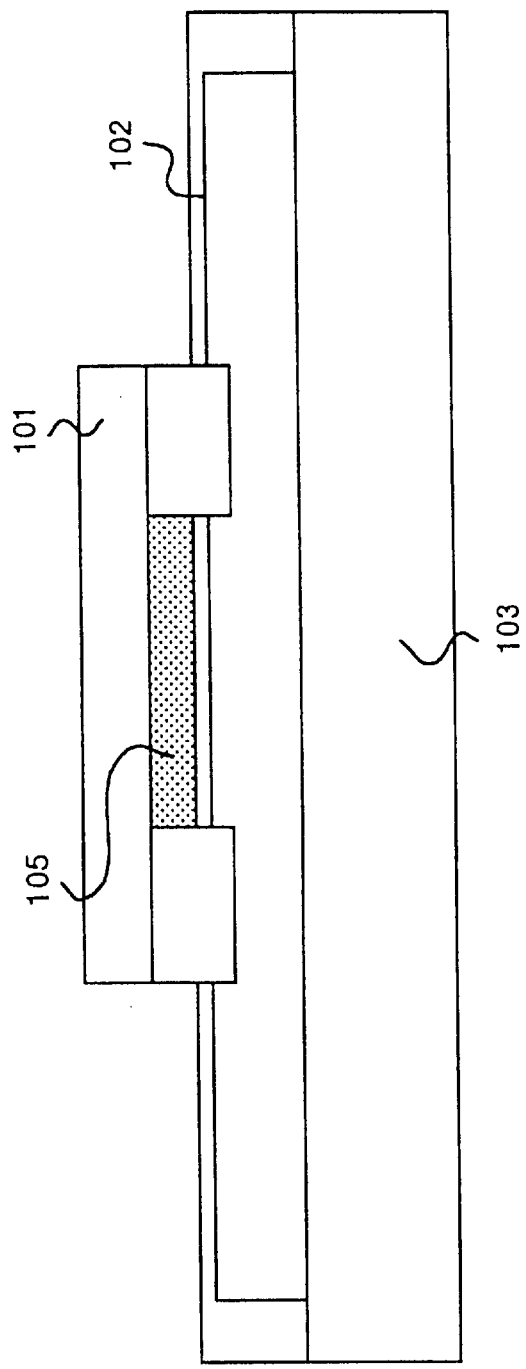
FIG. 12 is a side view showing a synchronous linear motor using a permanent magnet based on the conventional technology.

FIG. 10 shows a result of measurement of the cogging torque. The change of the cogging torque is generated according to a pitch p made in the arrangement of the permanent magnets 111 therebetween, and the cogging torque becomes a minimum when the cogging torque is changed in a sinusoidal wave-form, namely when a position of the fixed board 103 is shifted from the other board by p/2.

However, when it does not have a sinusoidal wave form like that shown in FIG. 10, the cogging torque does not always become a minimum when the board is shifted from the other one only by p/2. In this case, it is required to adjust a quantity of shift of the fixed board 103 to make the cogging torque be a minimum. In this step, a position of the fixed board 103 is adjusted with the fixed position adjuster 132, whereby cogging torque is made minimum and thrust ripple is made smaller, so that high precision positioning can be performed.

As understood from the description above, with the synchronous linear motor using a permanent magnet according to the present invention, an armature coil and a fixed side magnet both for generation of a repulsive force generates a repulsive force, making use of a mutual repulsion therebetween, for canceling out a load generated with a fare weight of a movable element and a loaded weight thereon, and reduces the load of a linear movement guide section, so that a static frictional force in the linear movement guide section of the movable element can be reduced, thus high precision positioning being realized.

With the synchronous linear motor using a permanent magnet according to another feature of the present invention, electric signal to the armature coil for generation of a repulsive force is controlled so that the load detected by the load detecting sensor will be zero, and the armature coil and the fixed side magnet both for generation of a repulsive force generates a repulsive force so that the force can completely cancel out the load generated according to a fare weight of the movable element as well as to the loaded weight thereto, whereby the load of the linear movement guide section according to the fare weight of the movable element as well as to the loaded weight thereon will be zero, so that a static frictional force in the linear movement guide section of the movable element can be reduced, thus high precision positioning being realized.

With the synchronous linear motor using a permanent magnet according to another feature of the present invention, iron powder attracted to the fixed side magnet is heated up with a heater, whereby the iron powder can be made non-magnetic, which makes it possible to easily remove the iron powder from the fixed side magnet, so that an air gap between the armature coil and the fixed side magnet can be maintained at a specified value, and the cogging torque can be prevented from increasing over time. With this feature, high precision positioning can be performed over a long period of time.

With the synchronous linear motor using a permanent magnet according to another feature of the present invention, the iron powder made non-magnetic by being heated up with the heater is removed by blowing off from the fixed side magnet, so that an air gap between the armature coil and the fixed side magnet can be maintained at a specified value, and the cogging torque can be prevented from increase over time. With this feature, high precision positioning can be performed over the long period of time.

With the synchronous linear motor using a permanent magnet according to another feature of the present invention, in a case where a cross beam or the like is driven by driving two units of synchronous linear motor using a permanent magnet in synchronism with each other, a pitch of each fixed side magnet in the two units of motor can relatively be displaced from each other with an adjusting mechanism, so that the cogging torque can be adjusted so as to be a minimum, and thrust ripple can be reduced, thus high precision positioning being performed.

This application is based on Japanese patent application No. HEI 8-133911 filed in the Japanese Patent Office on May 28, 1996, the entire contents of which are hereby incorporated by reference.

Although the invention has been described with respect to specific embodiments for a complete and clear disclosure, the appended claims are not to be thus limited but are to be construed as embodying all modifications and alternative constructions that may occur to one skilled in the art which fairly fall within the basic teaching herein set forth.

What is claimed is:

1. A synchronous linear motor comprising:

a stationary member and a movable member that moves along said stationary member;

an armature coil provided on said stationary member or said movable member, and a permanent magnet provided on the other one of said stationary member and said movable member, in opposition to said armature coil, said permanent magnet having alternating poles arranged in a direction of relative movement between said stationary member and said movable member; and a heater for heating iron powder from the environment that is attracted to said permanent magnet up to a temperature at which the iron powder is made non-magnetic.

2. A synchronous linear motor comprising:

a stationary member and a movable member that moves along said stationary member;

an armature coil provided on said stationary member or said movable member, and a permanent magnet provided on the other one of said stationary member and said movable member, in opposition to said armature coil, said permanent magnet having alternating poles arranged in a direction of relative movement between said stationary member and said movable member; and an adjusting mechanism for adjusting a location of said stationary member in said direction of relative movement.

3. A synchronous linear motor as recited in claim 2, wherein said adjusting mechanism comprises an adjuster screw.

4. A synchronous linear motor comprising:

a stationary member and a movable member that moves along said stationary member;

an armature coil provided on said stationary member or said movable member, and a permanent magnet provided on the other one of said stationary member and said movable member, in opposition to said armature coil, said permanent magnet having alternating poles arranged in a direction of relative movement between said stationary member and said movable member, said armature coil and said permanent magnet generating a repulsive force in a direction in which a load is received by said movable member;

an electric circuit for energizing said armature coil to generate the repulsive force in synchronism with the relative movement of said movable member and said stationary member; and a heater for heating iron powder from the environment that is attracted to said permanent magnet up to a temperature at which the iron powder is made non-magnetic.

5. A synchronous linear motor as recited in claim 4, further comprising an air blower for blowing air to said permanent magnet to blow off the iron powder.

6. An apparatus using a plurality of synchronous linear motors, comprising:

at least two stationary members and respective movable members that move along said stationary members in directions parallel to each other;

for each stationary member and movable member, an armature coil provided on said stationary member or said movable member, and a permanent magnet provided on the other one of said stationary member and said movable member, in opposition to said armature coil, said permanent magnet having alternating poles arranged in a direction of relative movement between said stationary member and said movable member; and an adjusting mechanism for adjusting a position of one stationary member relative to another stationary member in said direction of relative movement.

7. An apparatus as recited in claim 6, further comprising a cross member that couples said movable members.

* * * * *